United States Patent
Kimura (10) Patent No.: US 9,227,668 B2
(45) Date of Patent: Jan. 5, 2016

(54) JOINT STRUCTURE FOR MEMBERS OF DIFFERENT KINDS OF METAL

(71) Applicant: MAZDA MOTOR CORPORATION, Hiroshima (JP)

(72) Inventor: Takahiro Kimura, Osaka (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/426,941

(22) PCT Filed: Oct. 4, 2013

(86) PCT No.: PCT/JP2013/005929
§ 371 (c)(1),
(2) Date: Mar. 9, 2015

(87) PCT Pub. No.: WO2014/061223
PCT Pub. Date: Apr. 24, 2014

(65) Prior Publication Data
US 2015/0225020 A1    Aug. 13, 2015

(30) Foreign Application Priority Data
Oct. 15, 2012    (JP) ................. 2012-228061

(51) Int. Cl.
*B62D 25/00* (2006.01)
*B62D 25/08* (2006.01)
*B23K 11/11* (2006.01)
*B23K 20/12* (2006.01)
*B21J 15/14* (2006.01)
*B60R 5/04* (2006.01)
(Continued)

(52) U.S. Cl.
CPC .............. *B62D 25/087* (2013.01); *B21J 15/14* (2013.01); *B23K 11/11* (2013.01); *B23K 20/12* (2013.01); *B23K 20/122* (2013.01);
(Continued)

(58) Field of Classification Search
CPC ....... B62D 25/087; B21J 15/14; B23K 11/11; B23K 20/12; B23K 20/22; B23K 20/2275; B60R 5/044
USPC ................................................ 296/29, 37.16
See application file for complete search history.

(56) References Cited

U.S. PATENT DOCUMENTS 2,465,770 A * 3/1949 Voisk .................... B60N 2/3011
296/37.15
5,346,275 A * 9/1994 Enning ................ B62D 29/008
296/187.11
(Continued)

FOREIGN PATENT DOCUMENTS

JP  S57-212051 A   12/1982
JP  2002-274429 A   9/2002
(Continued)

OTHER PUBLICATIONS

International Search Report; PCT/JP2013/005929; Nov. 26, 2013.

*Primary Examiner* — Joseph D Pape
(74) *Attorney, Agent, or Firm* — Studebaker & Brackett PC (57) ABSTRACT

A Joint structure for members of different kinds of metals comprises a first member formed from a metal sheet, and a second member formed from a metal sheet having a coefficient of thermal expansion greater than that of the metal sheet for the first member, wherein the first member and the second member are superimposed on each other and spot-joined together at a plurality of positions in a first direction, and the second member has a bead portion extending along a second direction orthogonal to the first direction, at a position between adjacent ones of the spot-joined points.

4 Claims, 7 Drawing Sheets

(51) Int. Cl.
  *B23K 20/227* (2006.01)
  *B32B 15/01* (2006.01)

(52) U.S. Cl.
  CPC .......... *B23K 20/2275* (2013.01); *B32B 15/012* (2013.01); *B60R 5/044* (2013.01); *B23K 2201/006* (2013.01); *B23K 2203/20* (2013.01)

(56) References Cited

U.S. PATENT DOCUMENTS 5,498,050 A * 3/1996 Maruyama .............. B60R 5/044
  296/37.16

7,121,615 B2 * 10/2006 Hoshino ................ B62D 25/06
  296/187.12
8,172,298 B2 * 5/2012 Jeong ....................... B60N 2/68
  296/37.1
2005/0140158 A1 6/2005 Ogawa et al.

FOREIGN PATENT DOCUMENTS

| | | | |
|---|---|---|---|
| JP | 2005-119577 | A | 5/2005 |
| JP | 2005-343295 | A | 12/2005 |
| JP | 2006-326631 | A | 12/2006 |

* cited by examiner

| CONDITIONS | | COMPARATIVE EXAMPLE | FIRST EMBODIMENT | SECOND EMBODIMENT |
|---|---|---|---|---|
| MAXIMUM DISPLACEMENT (mm) | ASSUMED TEMPERATURE (VEHICLE INTERIOR 80°C) | 4.94 | 2.56 | 1.83 |
| MAXIMUM RESIDUAL DISPLACEMENT (mm) | AFTER COATING-BAKING (170°C→20°C) | 1.09 | 0.11 | 0.06 |
| MAXIMUM SHEARING LOAD AT SPOT-JOINED POINT(kN) | DURING COATING-BAKING (170°C) | 419.2 | 247.2 | 204.8 |
| | RESIDUAL LOAD AFTER COATING-BAKING (170°C→20°C) | 176.1 | 15.2 | 8.7 |

JOINT STRUCTURE FOR MEMBERS OF DIFFERENT KINDS OF METAL

TECHNICAL FIELD

The present invention relates to a joint structure for members of different kinds of metals, in a vehicle such as an automotive vehicle.

BACKGROUND ART

Heretofore, in regard to a side door or a rear door of a vehicle, it has been attempted to achieve weight reduction, while ensuring rigidity of the door, by forming an inner panel thereof from a steel sheet and forming an outer panel thereof from an aluminum alloy sheet. Matters to be considered in this case include a problem of deformation due to joint of different kinds of metals (dissimilar metals). That is, a steel sheet and an aluminum alloy sheet are different from each other in terms of thermal expansion coefficient. Thus, when a vehicle body is heated up, for example, in a coating baking process during manufacturing, or during parking under the blazing sun, a thermal strain such as flexure is likely to occur in a joined region due to the difference in thermal expansion coefficient. Therefore, in recent, a technique disclosed in the following Patent Literature 1 has been proposed as a joint structure for members of dissimilar metals (dissimilar metal members). This literature describes joining an aluminum roof panel and a roof side rail formed from a steel sheet together at a plurality of positions in a vehicle front-rear direction by non-penetrating rivets, and forming in the aluminum roof panel a bead portion extending along the joined areas (along the vehicle front-rear direction). That is, it is intended to absorb a vehicle width directional strain occurring due to a difference in thermal expansion coefficient between the aluminum roof panel and the roof side rail, by the bead portion formed in the aluminum roof panel.

However, the aluminum roof panel also undergoes thermal expansion in the vehicle front-rear direction. Thus, the technique disclosed in the Patent Literature 1 has difficulty in solving a strain of the aluminum roof panel in an alignment direction of the joined areas (vehicle front-rear direction.)

CITATION LIST

Patent Literature

Patent Literature 1: JP 2005-119577A

SUMMARY OF INVENTION

The present invention has been made in view of the above circumstances, and an object thereof is to provide a technique of, in dissimilar metal members joined together at a plurality of positions in a specific direction, suppressing the occurrence of a thermal strain in the specific direction.

The present provides a Joint structure for members of different kinds of metals, which comprises a first member formed from a metal sheet, and a second member formed from a metal sheet having a thermal expansion coefficient greater than that of the metal sheet for the first member, wherein the first member and second member are superimposed on each other and spot-joined together at a plurality of positions in a first direction, and the second member has a bead portion extending in a second direction orthogonal to the first direction, at a position between adjacent ones of the spot-joined points.

DESCRIPTION OF EMBODIMENTS

With reference to the accompanying drawings, a preferred embodiment of the present invention will now be described in detail.

Figure 1:
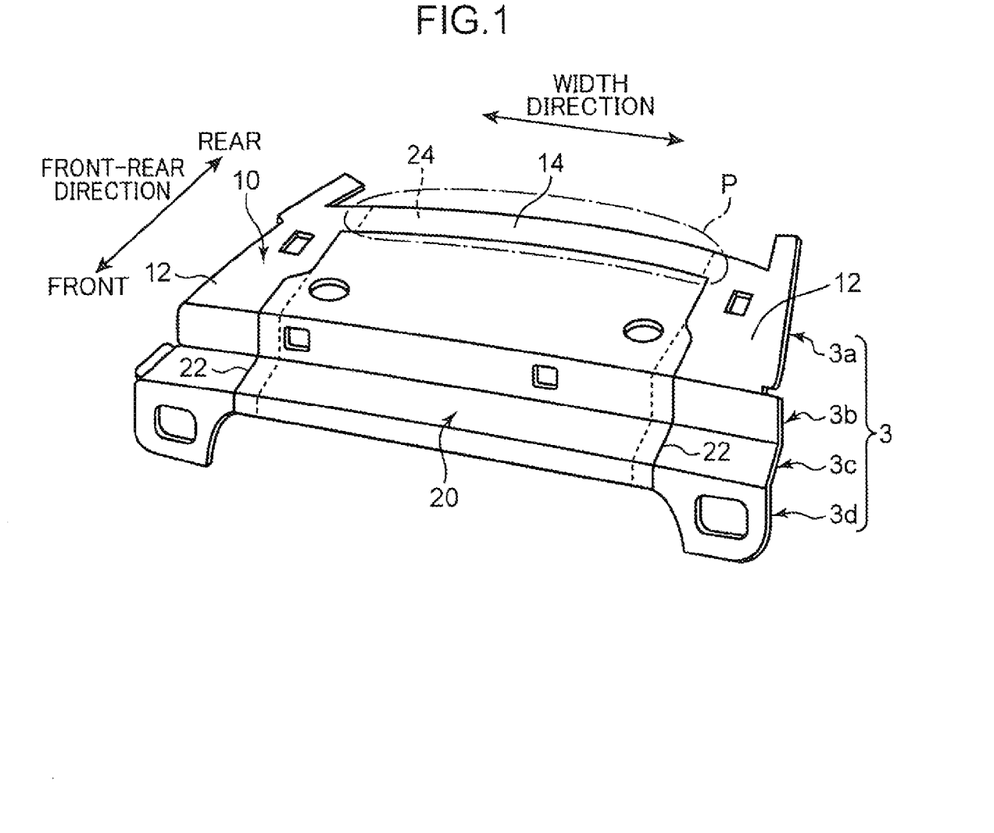
FIG. 1 is a perspective view illustrating a rear package tray to which the present invention is applied.
Figure 2:
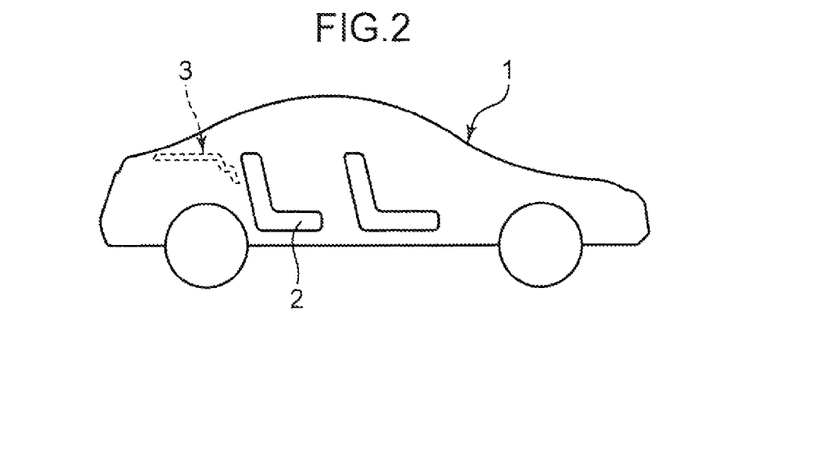
FIG. 2 is a schematic diagram illustrating a vehicle to explain an installation location of the rear package tray.

FIG. 1 is a perspective view illustrating a rear package tray to which the present invention is applied. As illustrated in FIG. 2, the rear package tray 3 is a panel member disposed rearward of a rear seat 2 in a vehicle body 1 to serve as a partition wall between a trunk (luggage) compartment and a passenger compartment. In the following description, the terms "front" and "rear" should be construed as being on the basis of a front-rear direction of the vehicle body 1, and, when the term "width direction" is used by itself, it should be construed as a width direction of the vehicle body 1.

As illustrated in FIG. 1, the rear package tray 3 has: a first horizontal region 3a located on the side of a rear end of the vehicle body 1; a first downwardly-extending region 3b extending downwardly from a front edge of the first horizontal region 3a; a second horizontal region 3c extending forwardly and horizontally from a lower edge of the first downwardly-extending region 3b; and a second downwardly-extending region 3d extending downwardly from a front edge of the second horizontal region 3c.

The rear package tray 3 primarily comprises a side-rear panel 10 (equivalent to "first member" set forth in the appended claims) forming an outer peripheral region of the rear package tray 3, and a center panel 20 (equivalent to "second member" set forth in the appended claims) forming a region of the rear package tray 3 inward of the side-rear panel 10, and has a structure formed by integrally joining the two panels 10, 20 together. Specifically, the side-rear panel 10 is formed in an angular C shape in top plan view, which has a pair of side sections 12 lying at respective opposite ends thereof in a width direction of the vehicle body 1 and extending in a front-rear direction, and a rear section 14 connecting rear ends of the side sections 12 together. On the other hand, the center panel 20 is formed in an approximately rectangular shape in top plan view, which has two flange sections 22 lying at width directional opposite ends thereof and extending in the front-rear direction. Then, as illustrated in FIG. 1, each of the flange sections 22 of the center panel 20 is superimposed on an upper surface of a respective one of the side sections 12 of the side-rear panel 10, and a rear end 24 of the center panel 20 is superimposed with respect to the rear section 14 of the side-rear panel 10 from therebelow in such a manner as to enter beneath the rear section 14. In this state, the superimposed regions are joined together, so that the side-rear panel 10 and the center panel 20 are integrated to form the rear package tray 3. The pair of side sections 12 and the rear section 14 may be formed as divided components, and then integrally joined by welding or the like in such a manner as to form an angular C shape in top plan view.

The side-rear panel 10 is formed from a steel sheet, and the center panel 20 is formed from an aluminum alloy sheet. Therefore, the rear package tray 3 has a structure which is reduced in weight while ensuring rigidity thereof as a whole.

In the rear package tray 3 formed from the steel sheet and the aluminum alloy sheet, the center panel 20 (aluminum alloy sheet) has a larger thermal expansion coefficient (large linear expansion coefficient) as compared to the side-rear panel 10 (steel plate). Thus, it is assumed that when the rear package tray 3 is heated up, for example, in a coating baking process, a strain occurs in a joined region between the side-rear panel 10 and the center panel 20, particularly, on the side of the center panel 20 having a larger thermal expansion coefficient. Therefore, this rear package tray 3 employs the following joint structure in a joined region P (a region indicated by the one-dot chain line in FIG. 1) between the rear section 14 of the side-rear panel 10 and the rear end 24 of the center panel 20 in the rear package tray 3.

Figure 3:
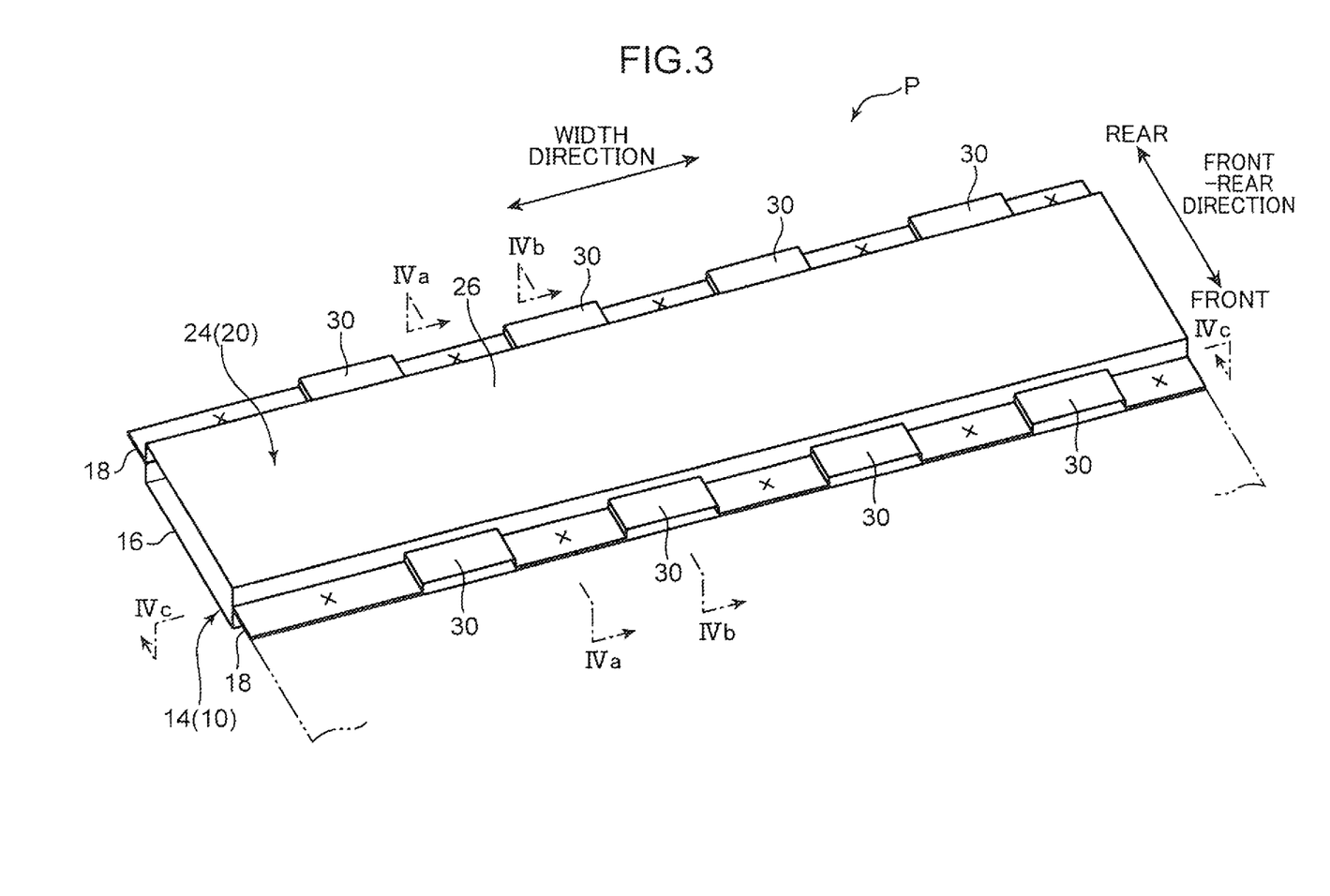
FIG. 3 is a perspective view illustrating a joined region between a side-rear panel and a center panel constituting the rear package tray (first embodiment).
Figure 4A:
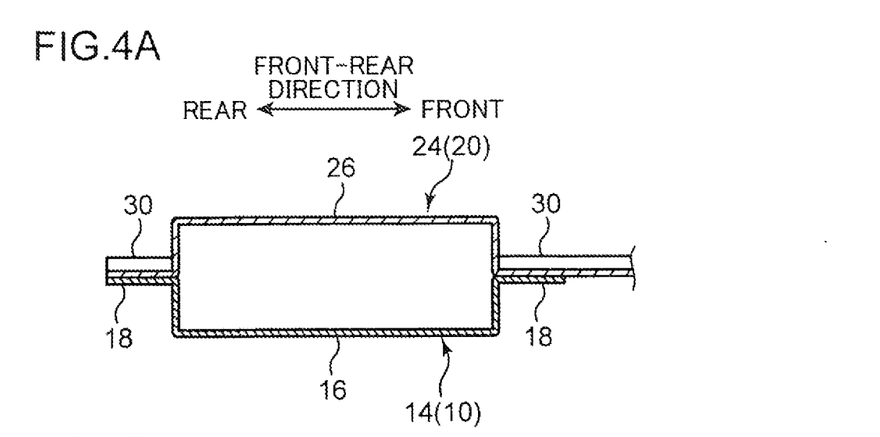
FIG. 4A is a sectional view taken along the line IVa-IVa in FIG. 3.
Figure 4B:
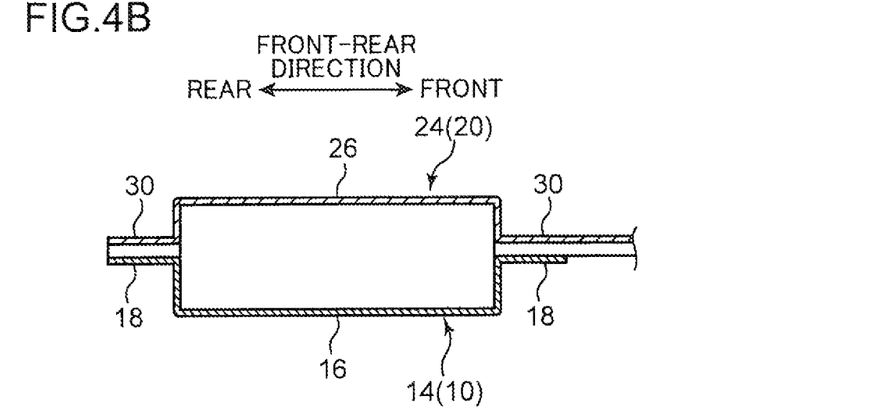
FIG. 4B is a sectional view taken along the line IVb-IVb in FIG. 3.
Figure 4C:
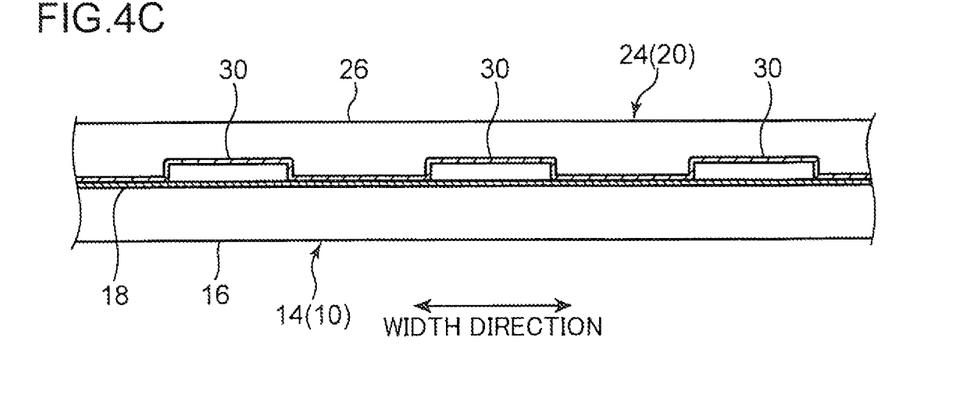
FIG. 4C is a sectional view taken along the line IVc-IVc in FIG. 3.

FIG. 3 is a perspective view illustrating the joined region P between the rear section 14 of the side-rear panel 10 and the rear end 24 of the center panel 20 in the rear package tray 3 (first embodiment), and FIGS. 4A to 4C are sectional views of the joined region P. In FIGS. 3 and 4, the joined region P is illustrated in a state in which the rear end 24 of the center panel 20 is located on an upper side.

As illustrated in FIGS. 3 and 4, the rear section 14 of the side-rear panel 10 is formed in a cross-sectionally hat-like shape which has: a cross-sectionally angular C-shaped bulging portion 16 bulging downwardly (bulging downwardly in FIGS. 3 and 4) and extending in the width direction (equivalent to "first direction" set forth in the appended claims); and a pair of flange portions 18 lying in continuous relation to respective opposite ends of the bulging portion 16 in the front-rear direction (equivalent to "second direction" set forth in the appended claims) and each extending in the width direction.

On the other hand, the rear end 24 of the center panel 20 has: a cross-sectionally angular C-shaped bulging portion 26 formed therein to bulge in a direction opposite to the bulging direction of the bulging portion 16 (bulge upwardly in FIGS. 3 and 4) at the same position as that of the rear section 14 of the side-rear panel 10 in the front-rear direction, and extend in the width direction; and a plurality of bead portions 30 lying at each of front and rear sides of the bulging portion 26 in side-by-side relation at even intervals in the width direction and each extending in the front-rear direction. Although each of the bead portions 30 is an upwardly-bulging cross-sectionally angular C-shaped portion formed in the rear end 24, as with the bulging portion 26, it has a bulging size (a dimension of a sidewall thereof in an up-down direction) less than that of the bulging portion 26, and a breadth (i.e., a distance between opposite sidewalls) less than that of the bulging portion 26.

As illustrated in FIGS. 3 and 4, the rear section 14 of the side-rear panel 10 and the rear end 24 of the center panel 20 are superimposed on each other in such a manner that the bulging portions 16, 26 bulge in mutually separating directions, and a hollow cross-section is defined by the two bulging portions 16, 26. In this state, the center panel 20 and each of the flange portions 18 are spot-joined together in regions outside the bulging portions 16, 26 in the front-rear direction, at a plurality of positions in the width direction (positions indicated by the "x" marks in FIG. 3). More specifically, the center panel 20 and each of the flange portions 18 are joined together by spot-welding, at two positions adjacent to respective width directional opposite edges of the rear end 24 of the center panel 20, and a position between adjacent ones of the bead portions 30 of the center panel 20 (each of the spot-welded positions will hereinafter be referred to as "spot-joined point"). In this embodiment, the center panel 20 and each of the flange portions 18 of the rear section 14 are joined by spot-welding. Alternatively, they may be joined together by any other joining means, for example, swaging means such as riveted joint, or means such as friction stir welding.

In the above joint structure between the rear section 14 of the side-rear panel 10 and the rear end 24 of the center panel 20, the joined region P has a hollow cross-section defined by the bulging portions 16, 26 of the panels 10, 20, so that it becomes possible to effectively enhance bending rigidity thereof. In addition, the bulging portion 26 configured as above is formed in the rear end 24 of the center panel 20 having a thermal expansion coefficient greater than that of the rear section 14. Thus, even in a situation where the rear package tray 3 is heated up, for example, in a coating baking process, thermal expansion of the rear end 24 in the front-rear direction is absorbed by the bulging portion 26. This suppresses the occurrence of a front-rear directional strain in the joined region P due to a difference in thermal expansion coefficient between the side-rear panel 10 and the center panel 20. Further, the bead portion 30 exists in the rear end 24 of the center panel 20 at a position between adjacent ones of the spot-joined points. Thus, the thermal expansion of the rear end 24 in the width direction, that is, a thermal expansion of the rear end 24 in the alignment direction of the spot-joined points, is effectively absorbed by the bead portion 30. This also suppresses the occurrence of a width directional strain in the joined region P. Thus, this joint structure can effectively suppress the occurrence of a strain in the joined region P due to a difference in thermal expansion coefficient between the side-rear panel 10 and the center panel 20, while enhancing bending rigidity of the joined region P between the side-rear panel 10 and the center panel 20.

Figure 5:
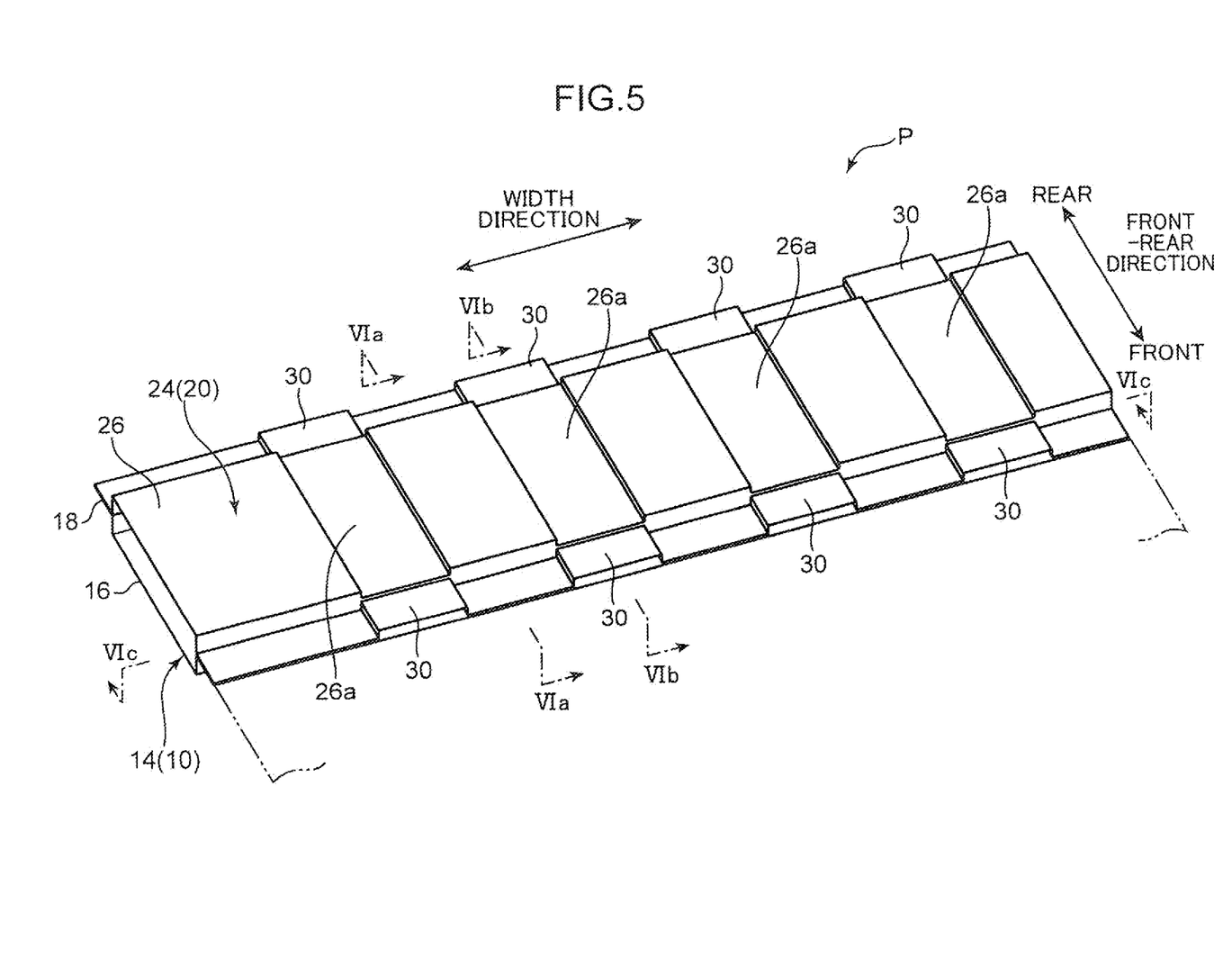
FIG. 5 is a perspective view illustrating a joined region between a first panel and a second panel constituting a rear package tray (second embodiment).
Figure 6A:
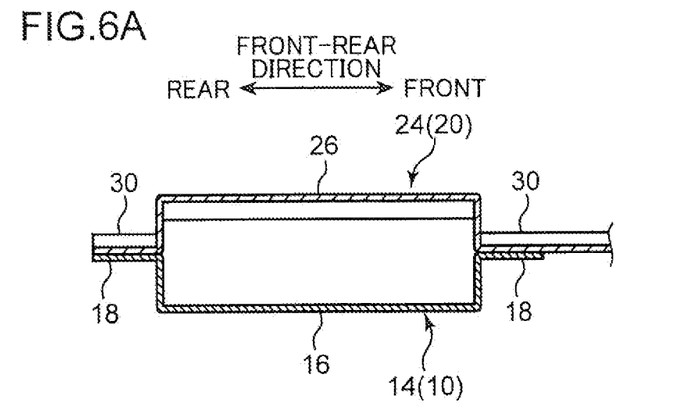
FIG. 6A is a sectional view taken along the line VIa-VIa in FIG. 5.
Figure 6B:
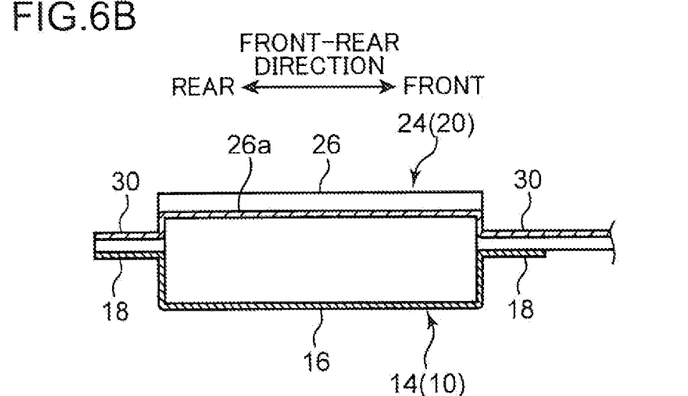
FIG. 6B is a sectional view taken along the line VIb-VIb in FIG. 5.
Figure 6C:
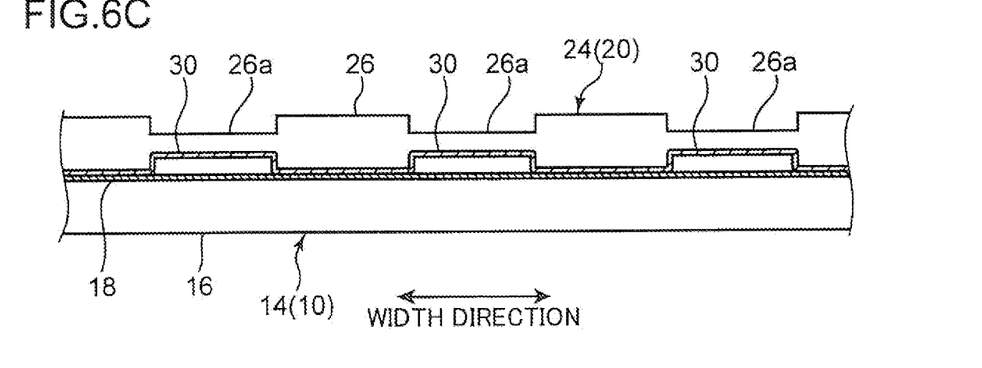
FIG. 6C is a sectional view taken along the line VIc-VIc in FIG. 5.

FIG. 5 is a perspective view illustrating another embodiment (second embodiment) of a joint structure (joined region P) between a rear section 14 of a side-rear panel 10 and a rear end 24 of a center panel 20, and FIGS. 6A to 6C are sectional views of the joined region P.

As illustrated in FIGS. 5 and 6A to 6C, in the second embodiment, the center panel 20 has a bulging portion 26 configured as described in the first embodiment and additionally formed with a plurality of grooves 26a extending in a front-rear direction. In this point, the second embodiment is structurally different from the first embodiment. Each of the grooves 26a is formed at a position corresponding to a respective one of the bead portions 30 in the width direction, and a width thereof is set to be equal to that of the bead portion 30.

The joint structure according to the second embodiment illustrated in FIGS. 5 and 6A to 6C and the joint structure according to the first embodiment illustrated in FIGS. 3 and 4A to 4C are approximately common in a fundamental structure. Thus, as shown in an aftermentioned result of CAE analysis, it is possible to enjoy the same function/effect as that in the first embodiment, i.e., the function/effect of effectively suppressing the occurrence of a strain in the joined region P due to a difference in thermal expansion coefficient between the side-rear panel 10 and the center panel 20, while enhancing bending rigidity of the joined region P between the side-rear panel 10 and the center panel 20.

Figure 7:
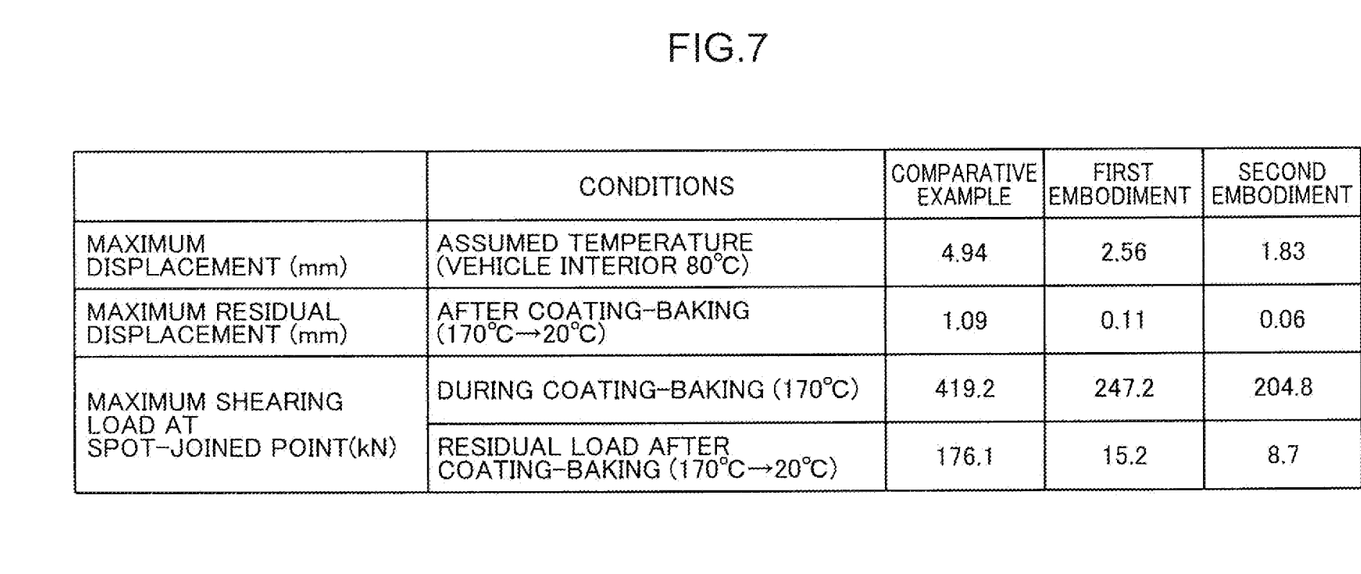
FIG. 7 is a table presenting a result of CAE analysis on thermal strain of each rear package tray.
Figure 8:
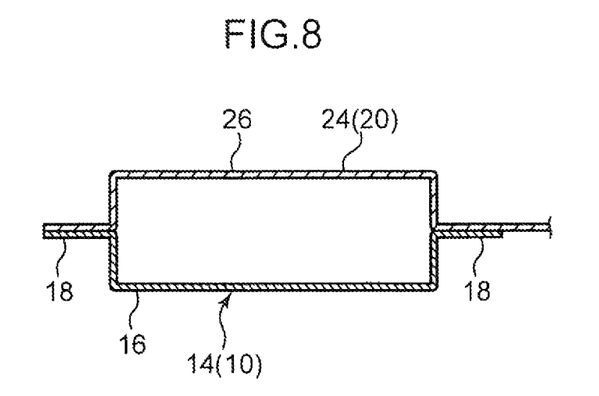
FIG. 8 is a sectional view illustrating a structure of a joint region of rear package tray in a comparative example.

FIG. 7 presents a result of CAE analysis on thermal strain of in the joined region P between the side-rear panel 10 (rear section 14) and the center panel 20 (rear end 24). Specifically, FIG. 7 represents a result obtained by subjecting each of two types of rear package trays employing the respective joint structures according to the first and second embodiments, and a rear package tray employing a joint structure in an aftermentioned comparative example, to analysis on a) a maximum displacement amount (mm) in the joined region P in the up-down direction when the rear package tray is heated up to an assumed vehicle interior temperature (80° C.), b) a maximum residual displacement amount (mm) in the joined region P in the up-down direction when the rear package tray is heated up to a coating baking temperature (170° C.) and then naturally cooled down to room temperature (20° C.), and c) a maximum shearing load occurring at spot-joined points (spot-welded points) located adjacent to width directional opposite edges. The displacement amount was analyzed at a position along a straight line passing through a center of the joined region P. As regards the analysis on the maximum shearing load, two types of loads: a load in a state in which the rear package tray is heated up to the coating baking temperature (170° C.), and a residual load when the rear package tray is heated up to the coating baking temperature (170° C.) and then naturally cooled down to room temperature (20° C.), were analyzed. A joint structure of "comparative example" in FIG. 7 is illustrated in FIG. 8. That is, it is a structure obtained by omitting the bead portions 30 from the joint structure according to the first embodiment illustrated in FIGS. 3 and 4A to 4C.

As shown in the analysis result, in the joint structures according to the first and second embodiments in which the center panel 20 (rear end 24) is formed with the bead portions 30, all analyzed values on the items a) to c) are lower than those of the joint structure of the "comparative example" in which the center panel 20 (rear end 24) is devoid of the bead portions 30. From this result, it can be considered that a strain in the joined region P due to a difference in thermal expansion coefficient between the side-rear panel 10 and the center panel 20, specifically, a strain in an alignment direction of the spot-joined points (in the width direction), is effectively suppressed by the bead portions 30. Further, in the joint structure according to the second embodiment in which the bulging portion 26 is formed with the grooves 26a, all analyzed values on the items a) to c) are lower than those of the joint structure of the first embodiment in which the bulging portion 26 is devoid of the grooves 26a. Thus, it is considered that the grooves 26a contribute to suppression of a strain in the alignment direction of the spot-joined points.

It should be noted that the above joint structure between the side-rear panel 10 (rear section 14) and the center panel 20 (rear end 24) is an example of a joint structure for dissimilar metal members according to a preferred embodiment of the present invention, and a specific structure thereof may be appropriately changed or modified without departing from the spirit and scope of the present invention as set forth in appended claims.

For example, in the above embodiments, each of the bead portions 30 formed in the center panel 20 has a cross-sectionally angular C shape. Alternatively, the shape thereof may be a cross-sectionally circular arc or triangular shape.

Although each of the above embodiments has been described based on an example where the joint structure for dissimilar metal members of the present invention is applied to a rear package tray 3, the application of the joint structure of the present invention is not limited to the rear package tray 3, but the joint structure of the present invention may be applied to a side door, a rear door, a hood (bonnet), trunk lid and the like.

In the joint structures according to the first and second embodiments, the side-rear panel 10 is formed from a steel sheet, and the center panel 20 is formed from an aluminum alloy sheet. However, a combination of metal materials for the side-rear panel 10 and the center panel 20 is not limited thereto. For example, the side-rear panel 10 may be formed from a steel sheet, and the center panel 20 may be formed from a magnesium alloy sheet having a thermal expansion coefficient greater than that of the steel sheet. In this case, substantially the same functions/effects as those of the first and second embodiments can be obtained.

The present invention described as above will be outlined as follows.

The joint structure for members of different kinds of metals of the present invention comprises a first member formed from a metal sheet, and a second member formed from a metal sheet having a thermal expansion coefficient greater than that of the metal sheet for the first member, wherein the first member and second member are superimposed on each other and spot-joined together at a plurality of positions in a first direction, and the second member has a bead portion extending in a second direction orthogonal to the first direction, at a position between adjacent ones of the spot-joined points.

In the joined structure of the present invention, the bead portion formed between adjacent ones of the spot-joined points can absorb thermal expansion of the second member in the first direction, to thereby suppress a strain in the joined region between the first and second members due to a difference in thermal expansion coefficient between the first and second members, particularly, a strain in an alignment direction of the spot-joined points (in the first direction).

Preferably, in the joint structure of the present invention, the first member and the second member are formed, respectively, with two bulging portions bulging in mutually separating directions and extending in the first direction, and spot-joined together at a plurality of positions in the first direction, in each of two regions on both sides of the bulging portions in the second direction.

In this joined structure, the joined region between the first and second members has a hollow cross-section, so that it becomes possible to effectively enhance bending rigidity of the joined region. In addition, the bulging portion of the second member can absorb thermal expansion of the second member in the second direction, to thereby suppress a strain in the joined region between the first and second members in the second direction.

Preferably, in the above joint structure, the bulging portion of the second member is formed with a groove extending in the second direction, at a position corresponding to the bead portion in the first direction.

This joined structure can effectively suppress the occurrence of a strain in the second member, while enhancing bending rigidity of the joined region between the first and second members.

As a more specific configuration, when the first member and the second member are joined together to form a rear package tray to be disposed rearward of a rear seat of a vehicle, they may be spot-joined together at a plurality of positions in a vehicle width direction corresponding to the first direction.

This joint structure can effectively suppress a situation where a strain occurs in the rear package tray due a difference in thermal expansion coefficient between the first and second members, during a vehicle manufacturing process, for example, in a coating baking process. In this case, it is preferable that the first member is superimposed above the second member.

As specific materials, there are various combinations. For example, it is contemplated that the first member is formed from a steel sheet, and the second member is formed from an aluminum alloy sheet. That is, because the aluminum alloy sheet has a thermal expansion coefficient greater than the steel plate, this joint structure can suppress a strain in the joined region between the first and second members.

The invention claimed is:

1. A joint structure for dissimilar metal members, comprising a first member formed from a metal sheet, and a second member formed from a metal sheet having a thermal expansion coefficient greater than that of the metal sheet for the first member, wherein the first member and second member are formed, respectively, with two bulging portions bulging in mutually separating directions and extending in a first direction, the first member and second member being superimposed on each other and spot-joined together at a plurality of positions in the first direction, in each of two regions on both sides of the bulging portions in a second direction orthogonal to the first direction, the second member has a bead portion extending in the second direction, at a position between adjacent ones of the spot-joined points, and the bulging portion of the second member is formed with a groove extending in the second direction, at a position corresponding to the bead portion in the first direction.

2. The joint structure as defined in claim 1, wherein the first member and the second member are joined together to form a rear package tray to be disposed rearward of a rear seat of a vehicle, and wherein the first member and the second member are spot-joined together at a plurality of positions in a vehicle width direction corresponding to the first direction.

3. The joint structure as defined in claim 2, wherein the first member is superimposed above the second member.

4. The joint structure as defined in claim 1, wherein the first member is formed from a steel sheet, and the second member is formed from an aluminum alloy sheet.

* * * * *